(12) United States Patent
Vanderpool et al.

(10) Patent No.: US 10,726,004 B2
(45) Date of Patent: Jul. 28, 2020

(54) ENTERPRISE INTEGRATION PROCESSING FOR MAINFRAME COBOL PROGRAMS

(71) Applicant: Walmart Apollo, LLC, Bentonville, AR (US)

(72) Inventors: Clifford Vanderpool, Centerton, AR (US); Mark Kevin Lankford, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 181 days.

(21) Appl. No.: 15/915,715

(22) Filed: Mar. 8, 2018

(65) Prior Publication Data
US 2018/0260436 A1    Sep. 13, 2018

Related U.S. Application Data

(60) Provisional application No. 62/469,320, filed on Mar. 9, 2017.

(51) Int. Cl.
| | |
|---|---|
| *G06F 16/242* | (2019.01) |
| *G06F 9/54* | (2006.01) |
| *G06F 16/25* | (2019.01) |
| *G06F 16/22* | (2019.01) |
| *G06F 16/2455* | (2019.01) |

(52) U.S. Cl.
CPC .......... *G06F 16/2448* (2019.01); *G06F 9/541* (2013.01); *G06F 16/2282* (2019.01); *G06F 16/2456* (2019.01); *G06F 16/258* (2019.01)

(58) Field of Classification Search
CPC ... G06F 8/427; G06F 16/2448; H04W 76/023
See application file for complete search history.

(56) References Cited

U.S. PATENT DOCUMENTS

| | | |
|---|---|---|
| 8,127,308 B1 | 2/2012 | Laura |
| 8,291,372 B2 | 10/2012 | Dangeville |
| (Continued) | | |

FOREIGN PATENT DOCUMENTS

| | | |
|---|---|---|
| CN | 103729463 A | 4/2014 |
| CN | 104516979 A | 4/2015 |
| CN | 105787029 A | 7/2016 |

OTHER PUBLICATIONS

International Search Report and Written Opinion for PCT Application No. PCT/US2018/021536, dated May 4, 2018.

(Continued)

*Primary Examiner* — Etienne P Leroux
(74) *Attorney, Agent, or Firm* — Schmeiser, Olsen & Watts LLP (57) ABSTRACT

A method for facilitating a mainframe batch COBOL program to read from a cloud database is provided. The method includes receiving a first search predicate and a second search predicate from an extended language pre-compiler, the extended language pre-compiler parsing a user query written as a SQL query, building a cloud database format query based on the first search predicate and the second search predicate, transmitting the cloud database format query to the cloud database to extract data stored on the cloud database associated with the user query, and receiving the extracted data from the cloud database in a Java Script Object Notation (JSON) format.

18 Claims, 4 Drawing Sheets

(56) References Cited

U.S. PATENT DOCUMENTS

| | | | |
|---|---|---|---|
| 9,122,489 B1* | 9/2015 | Vanderpool | G06F 8/41 |
| 2003/0056192 A1 | 3/2003 | Burgess | |
| 2003/0167357 A1 | 9/2003 | Goode | |
| 2013/0097134 A1 | 4/2013 | Thompson et al. | |
| 2013/0174132 A1 | 7/2013 | Fenicle et al. | |
| 2013/0211944 A1 | 8/2013 | Momin et al. | |
| 2014/0019977 A1 | 1/2014 | Kakade et al. | |
| 2014/0222641 A1 | 8/2014 | Køber et al. | |
| 2015/0160934 A1 | 6/2015 | Beit-Aharon | |
| 2015/0347541 A1 | 12/2015 | Holmes et al. | |
| 2018/0184464 A1* | 6/2018 | Fang | H04L 67/12 |

OTHER PUBLICATIONS

Khalek et al. "Query-Aware Test Generation Using a Relational Constraint Solver." In"Proceedings of the 2008 23rd IEEE/ACM international Conference on Automated Software Engineering." Sep. 15, 2008. Retrieved from <https://pdfs.semanticscholar.org/9c6b/80ffc407f2f6b4c35c439044d5ce69978375.pdf>, entire document.

"WebSphere Commerce search interactions," IBM.com, accessed Jan. 13, 2017.

Seeley, Yonik "Apache Solr Reference Guide JSON Request API," last modified Jul. 14, 2015.

International Preliminary Report on Patentability for PCT Application No. PCT/US18/021536, dated Sep. 19, 2019. 13 pages.

* cited by examiner

ENTERPRISE INTEGRATION PROCESSING FOR MAINFRAME COBOL PROGRAMS

CROSS REFERENCE TO RELATED APPLICATION[S]

This application claims the benefit of U.S. Provisional application No. 62/469,320, filed Mar. 9, 2017, the contents of which are incorporated herein in their entirety.

TECHNICAL FIELD

The present invention relates to systems and method for enterprise integration, and more specifically to embodiments of systems and methods for integration and communication between COBOL programs and cloud databases.

BACKGROUND

Many business entities have many disparate systems gathering information used to run the business. These disparate systems reside on multiple computer system platforms, including a mainframe, a personal computer (PC), and UNIX platforms. The computer system platforms, such as mainframe based system, have a basic language called EBCDIC and the PC/UNIX-based systems use ASCII.

SUMMARY

A first aspect relates to a method for facilitating a mainframe batch COBOL program to read from a cloud database, comprising: receiving, by a processor of a computing system, a first search predicate and a second search predicate from an extended language pre-compiler, the extended language pre-compiler parsing a user query written as a SQL query, building, by the processor, a cloud database format query based on the first search predicate and the second search predicate, transmitting, by the processor, the cloud database format query to the cloud database to extract data stored on the cloud database associated with the user query, and receiving, by the processor, the extracted data from the cloud database in a Java Script Object Notation (JSON) format.

A second aspect relates to a computer system, comprising: a processor, a memory device coupled to the processor, and a computer readable storage device coupled to the processor, wherein the storage device contains program code executable by the processor via the memory device to implement a method for facilitating a mainframe batch COBOL program to read from a cloud database, the method comprising: receiving, by a processor of a computing system, a first search predicate and a second search predicate from an extended language pre-compiler, the extended language pre-compiler parsing a user query written as a SQL query, building, by the processor, a cloud database format query based on the first search predicate and the second search predicate, transmitting, by the processor, the cloud database format query to the cloud database to extract data stored on the cloud database associated with the user query, and receiving, by the processor, the extracted data from the cloud database in a Java Script Object Notation (JSON) format.

A third aspect relates to a computer program product, comprising a computer readable hardware storage device storing a computer readable program code, the computer readable program code comprising an algorithm that when executed by a computer processor of a computing system implements a method for facilitating a mainframe batch COBOL program to read from a cloud database, comprising: receiving, by a processor of a computing system, a first search predicate and a second search predicate from an extended language pre-compiler, the extended language pre-compiler parsing a user query written as a SQL query, building, by the processor, a cloud database format query based on the first search predicate and the second search predicate, transmitting, by the processor, the cloud database format query to the cloud database to extract data stored on the cloud database associated with the user query, and receiving, by the processor, the extracted data from the cloud database in a Java Script Object Notation (JSON) format The foregoing and other features of construction and operation will be more readily understood and fully appreciated from the following detailed disclosure, taken in conjunction with accompanying drawings.

DETAILED DESCRIPTION

Disparate systems residing on multiple computer system platforms, including a mainframe, a personal computer (PC), and UNIX platforms use different basic language formats. The different language platforms have never exchanged information and/or data in a dynamic way where a program written on the mainframe can read/write to file structures on the PC/UNIX systems, or visa-versa. Existing applications are hard bound to the applications' file structures via the nature of compiling the code. Compilers create the run time executable code (e.g. machine code) that allows the computer to connect the process to the data via addressability. The compiler knows where the process instructions (i.e. code) are and where the data lives using addresses within the computer's memory, which may be referred to as 24, 32, or 64 bit addressability.

Previously, applications would unload data, then, using utilities expressly for the purpose of transforming the basic language from one form to the other, translate the forms from one to the other, then send the translated information to the other platform for that application to process the information. Large business entities may have thousands of mainframe batch common business-oriented language (COBOL) programs that use EBCDIC as a basic language, but the information for the COBOL programs may now be sourced on a cloud database system that uses the ASCII based language format. The work load to rebuild the COBOL programs the old way could take years, with hundreds of thousands of hours of work. Accordingly, all these factors taken together create systems that must have the systems' application code and data reside on the same platform, which may be referred to as a hard-bound system. Creating new systems, and making those new systems work with the old systems, would be very expensive and consume significant time and resources.

Thus, there is a need for systems and methods for integration and communication between COBOL programs and cloud databases.

Utilizing a loosely-coupled applications technique called Service Oriented Architecture, embodiments of the present invention may include a new intermediate tool to allow the vast old batch COBOL system(s) to access Enterprise Master Data file structures with minimal work. For example, embodiments of the present invention may use a pre-compiler in conjunction with an adapter to allow existing batch COBOL system(s) to access Enterprise Master Data file structures stored in a cloud database. In an exemplary embodiment, the adapter may facilitate mainframe applications interacting directly with modern cloud databases, such as Cassandra, HANNA, Oracle, Mongo, Greenplum, etc. Embodiments of the present invention may be designed to be easily adoptable for both mainframe online and batch applications, so that a user does not need to learn cloud database query language, such as UNIX-based system language, or a Cassandra Query Language (CQL) concepts. To query the data from a cloud based database, such as a UNIX-based database (e.g. Cassandra), the user just needs to write an 'SQL' like select query using either cursor technique or normal select query with a load temporary table option, similar to DB2 methods.

Furthermore, embodiments of the present invention may include an Extended Language Processor (ELP) Macro (e.g. pre-compiler), which may parse the user query and pass the SELECT predicates and WHERE predicates information to a mainframe COBOL adapter. Embodiments of the adapter may process both WHERE predicates and SELECT predicates. Embodiments of the adapter may build a cloud database query language query, such as a CQL query, dynamically. In response to building to the cloud database language query, such as a CQL query, embodiments of the adapter may utilize an open source search platform, such as SOLR, using REST service call to interface with the cloud database. While interfacing with the cloud database, the engine, such as a SOLR engine, may retrieve the data in Java Script Object Notation (JSON) format, which may then be received by the adapter. Further. Embodiments of the adapter may provide the received data in JSON format to another ELP Macro, which in turn may parse the data and return the values either to a user routine or adapter routine if the user wants to load the data into Temp table. If the values are returned to adapter, embodiments of the adapter may call another routine, which may create a Temporary (TEMP) table dynamically, load the data into the TEMP table, and return the call to the user.

Embodiments of the adapter may be a main routine, but may include additional modules for invoking additional routines based on the user use cases. A first module associated with a first additional routine (or subroutine) may be invoked when the user query has equal search predicates and the user wants to load the data into a TEMP table. The first additional module of the adapter may create the TEMP table dynamically, and load the data into the TEMP table. A second additional module associated with a second additional routine (or subroutine) may be invoked when the user query has unequal predicates and the user wants to load the data into a TEMP table. The second additional module may create the TEMP table dynamically, and loads the data into the TEMP table after processing unequal predicates (e.g. >, <, >=, <= and < >). A third additional module associated with a third additional routine (or subroutine) may perform almost all the actions of the adapter, and may be invoked by the adapter when the user wants to join two column families.

Accordingly, embodiments of the present invention may offer a technology/computer-based solution over existing techniques for many reasons. First, embodiments of the present invention may: establish a universal process for all mainframe applications used across a business enterprise to be able to access data stored on a cloud database, such as Cassandra; provide for convenient data abstraction; create a single process for both mainframe batch and online applications; a user can just query the required fields in a SQL format to retrieve data from the cloud database; provide a provision to load the data into a TEMP table, enabling the user to join the data in Temp table with another DB2 table; provide a provision to join two column families on the cloud-based database, for example, when both the column families defined on a single port, or irrespective of the port; allow for direct access to cloud-based database by using a REST service call; avoid forcing users to learn new cloud database query concepts; and allow for easy adaptation to existing business protocols.

Figure 1:
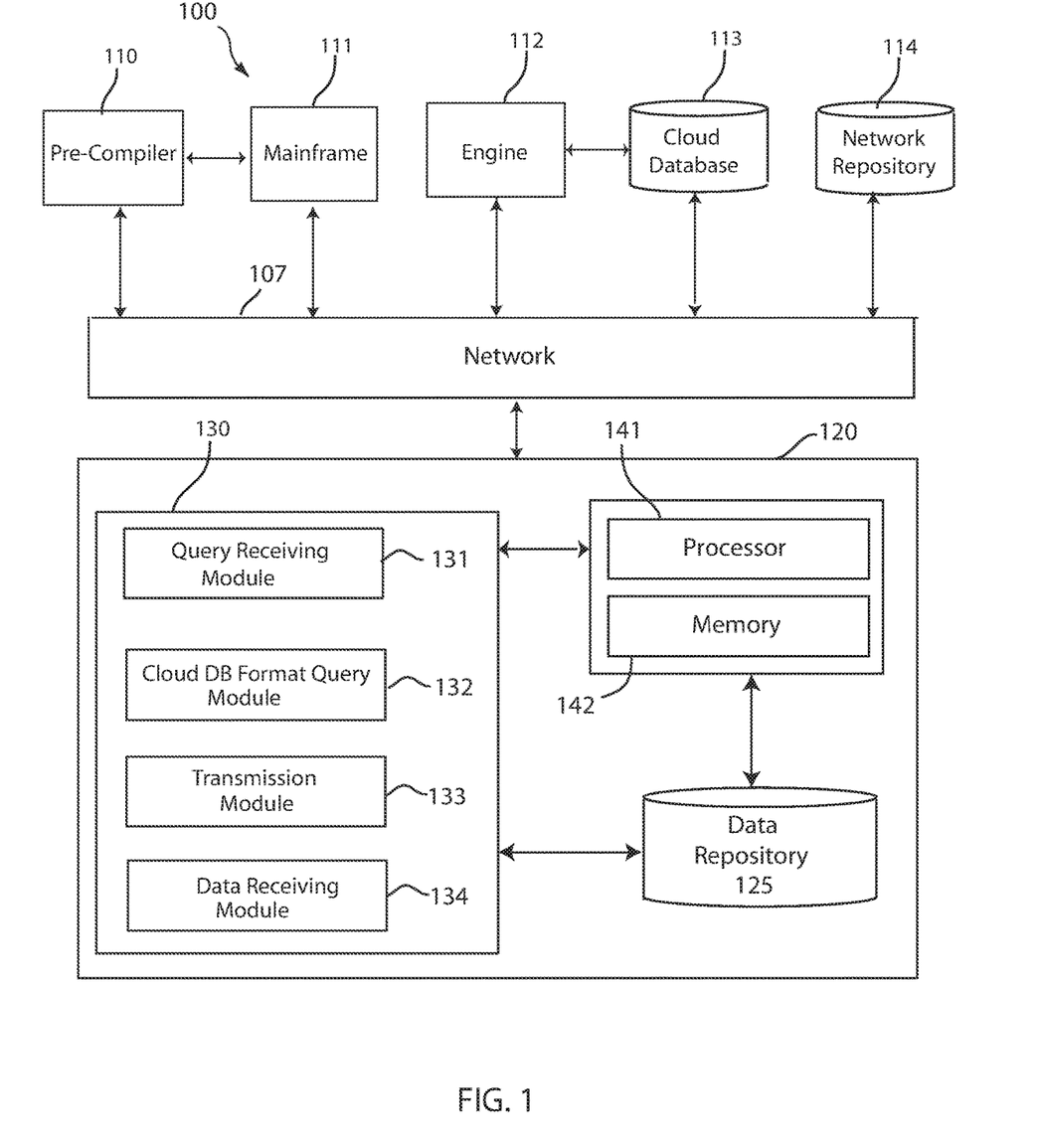
FIG. 1 depicts a block diagram of an enterprise integration processing system, in accordance with embodiments of the present invention.

Referring now to the drawings, FIG. 1 depicts a block diagram of an enterprise integration processing system 100, in accordance with embodiments of the present invention. Embodiments of the enterprise integration processing system 100 may be described as a system for enabling applications, such as COBOL programs, to access a cloud database 113 with minimal code changes.

Embodiments of the enterprise integration processing system 100 may include a pre-compiler 110. Embodiments of the pre-compiler 110 may be an ELP macro that may parse user search queries and pass the search predicates to a computing system 120, which may be referred to as an adapter. The pre-compiler 110 may be an extended language pre-compiler as described in U.S. Pat. No. 9,122,489, the entire contents of which are hereby incorporated by reference. The pre-compiler 1110 may compile COBOL programs with an internal mapping process to allow the batch programs to call a Service Oriented Architecture program and get a connection to the cloud database, which may have a UNIX platform, via another application, for example SOLR, wherein this connection gives the COBOL program a mapping routine to provide the data in the cloud platform database 113 to the program in an easy-to use-format. Embodiments of the pre-compiler 110 may receive user search queries from user using one or more applications on a mainframe 111. Embodiments of the mainframe 111 may service and/or execute legacy applications, batch and online programs, batch COBOL programs, and the like. The mainframe 111 may be one or more servers and/or computing devices connected to one or more computing systems being used by the users of a business enterprise. A user may enter a SQL query via mainframe 111, which may then be parsed by the pre-compiler 110. Moreover, embodiments of the enterprise integration processing system 100 may include a engine 112. Embodiments of the engine may be a SOLR search engine, an elastic search engine, a SOLR elastic search engine, and the like. Embodiments of the engine 112 may use the cloud database format query, such as SOLR formal query, from the computing system 120 to access and/or query the cloud database 113 to extract data stored on the cloud database 113 associated with the user query. Embodiments of the enterprise integration processing system 100 may also include a cloud-based database 113. Embodiments of the cloud-based database 113 may be an enterprise level master database. For instance, embodiments of the enterprise level master database may act as a centralized source of data for all applications in a distributed platform, as well as for applications associated with the mainframe 111.

Moreover, embodiments of the pre-compiler 110, the mainframe 111, the engine 112, and the cloud database 113 may be coupled to a computing system 120 over a network 107. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the pre-compiler 110, the mainframe 111, the engine 112, and the cloud-based database 113, a connection to one or more network accessible knowledge bases containing information of one or more users, network repositories 114 or other systems connected to the network 107 that may be considered nodes of the network 107. In some embodiments, where the computing system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging data sent by or received from the mainframe 11 or engine 112 to generate both historical and predictive reports regarding a performance or capacity of computing system 120. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

Referring still to FIG. 1, embodiments of the computing system 120 may be an adapter, a mainframe COBOL adapter, and the like, for enterprise integration and communication between COBOL programs and cloud databases. Embodiments of the computing system 120 may be one or more servers or computing systems. In an exemplary embodiment, the computing system 120 may include a service oriented architecture (SOA). Embodiments of the computing system 120 may include an adapter system 130. Embodiments of the adapter system 130 may include a query receiving module 131, a cloud database format query module 132, a transmission module 133, and a data receiving module 134. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device 142 of the computer system 120, which may be coupled to the adapter system 130. A module (whether hardware, software, or a combination thereof) may be designed to implement or execute one or more particular functions or routines.

Figure 2:
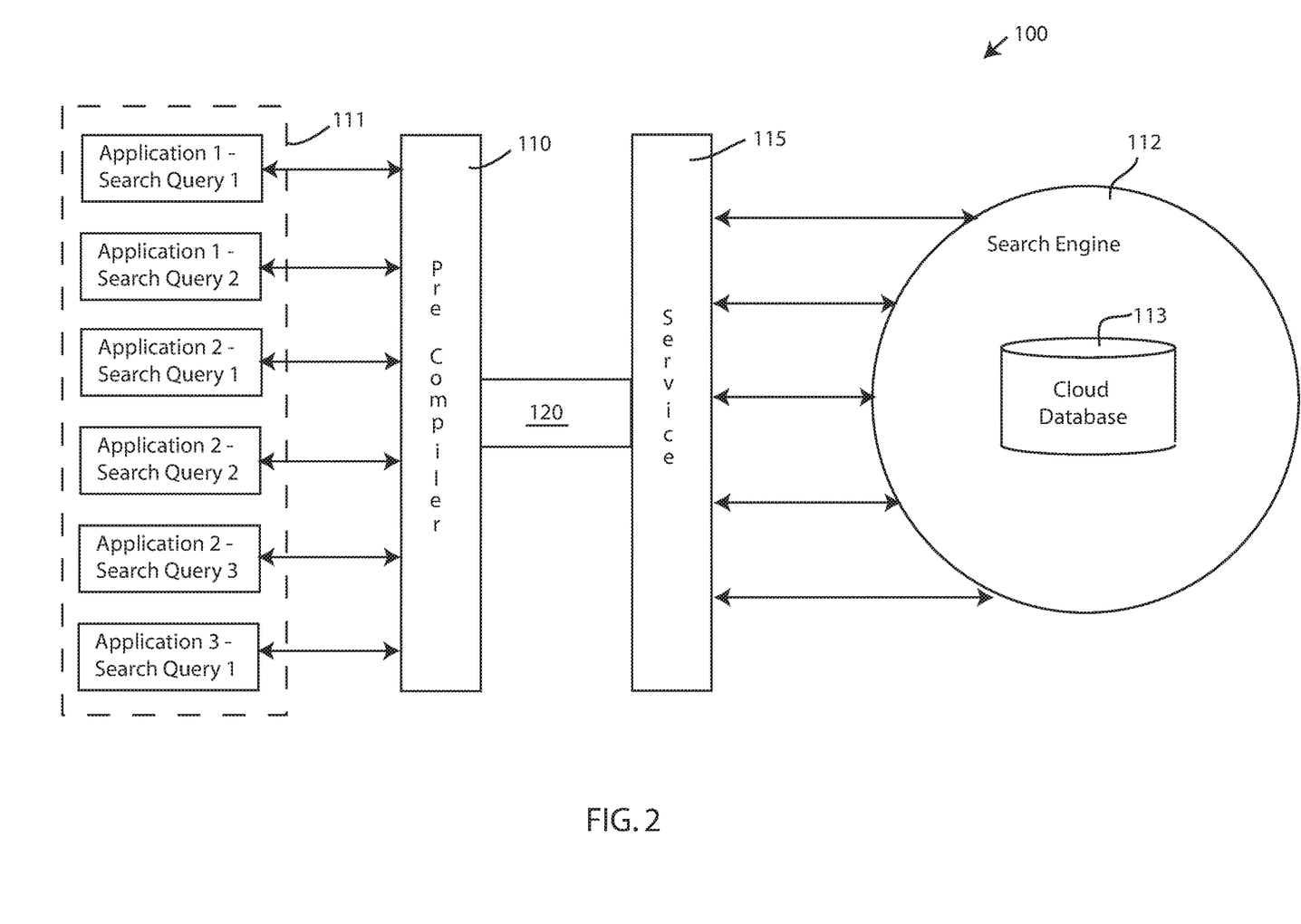
FIG. 2 depicts a more detailed block diagram of the enterprise integration processing system 100 of FIG. 1, in accordance with embodiment of the present invention.

FIG. 2 depicts a more detailed block diagram of the enterprise integration processing system 100 of FIG. 1, in accordance with embodiment of the present invention. Embodiments of the computing system 120, as depicted in FIG. 2, may include the adapter system 130, which may be in communication with the pre-compiler 110, mainframe 111, and engine 112. Embodiments of the query receiving module 131 of the adapter system 130 may include one or more components of hardware and/or software program code for receiving a first search predicate and a second search predicate from an extended language pre-compiler 110, the extended language pre-compiler 110 parsing a user query written as a SQL query. For instance, embodiments of the pre-compiler 110 may interact with the user query to parse the user query, and then may call the computing system 120. The computing system 120 may thus receive the parsed user query from the pre-compiler 110 in a form of one or more search predicates. Embodiments of a search predicate may be SELECT, WHERE, and the like. Examples of a user query parsed by the pre-compiler 110, and ultimately received by the computing system 120, include:

```
Simple SELECT query to fetch one row:
    EXEC ELP MDM
        SELECT          region_code,
                        market_code
        INTO            :WS-REGION-CODE,
                        :WS-MARKET-CODE
        FROM            STORE
        WHERE           business_unit_nbr = 8209
        AND                 country_code = 'US'
        END-EXEC.
CURSOR Declaration:
    EXEC ELP MDM DECLARE CURSOR __name__
        SELECT          business_unit_nbr,
                        Region_code,
                        Subdivision_code,
                        Market_code
        FROM            STORE
        WHERE           country_code='US'
        END-EXEC.
CURSOR Open:
    EXEC ELP MDM OPEN __name__
    END-EXEC
CURSOR Fetch:
    EXEC ELP MDM FETCH __name__
        INTO     :WS-BUS-UNIT,
                 :WS-REGION-CODE,
                 :WS-SUB-DIV-CODE,
                 :WS-MARKET-CODE
        END-EXEC.
CURSOR Close:
    EXEC ELP MDM CLOSE __name__
    END-EXEC.
```

The search predicates belonging to the user query may be passed to the computing system 120 via the pre-compiler 110. For instance, multiple applications, such as Application 1, Application 2, and Application 3, may reside on mainframe 111, as shown in FIG. 2. Multiple search queries may be authored by a user operating Application, 1, Application 2, or Application 3. The search queries, which may be in a SQL format from the user, may be parsed by the pre-complier 110 coupled to the computing system 120 for building a query that corresponds to the query language associated with the cloud database 113, such as a CQL query or other cloud database query languages.

Moreover, embodiments of the computing system 120 may include a cloud database format query module 132. Embodiments of the cloud database format query module 132 of the adapter system 130 of the computing system 120 may include one or more components of hardware and/or software program code for building a cloud database format query based on the search predicate(s) received from the pre-compiler 110. The cloud database format query may be a format of an open source system that may provide the ability to build a format query for any cloud database. In one embodiment, the open source system may be SOLR to build a SOLR format query. Instead of a SOLR format query (i.e. not using SOLR), module 132 may build a cloud capable or cloud compatible format query, using other open source software systems, which may cooperate with any cloud database. The cloud database format query may be built using a service 115 associated with the engine 112, or may be built by the engine 112. For instance, embodiments of the cloud database format query module 132 may process the search predicates, such as both WHERE predicates and SELECT predicates, to build a cloud database query language, such as a CQL query, dynamically. The cloud database query language may be used to query the cloud database 113, without the user having to initially enter a cloud database query.

Embodiments of the computing system 120 may include a transmission module 133. Embodiments of the transmission module 133 of the adapter system 130 of the computing system 120 may include one or more components of hardware and/or software program code for transmitting the cloud database format query to the cloud based database 113 to extract data stored on the cloud based database 113 associated with the user query. Embodiments of the transmission module 133 may also be referred to as a database communication module that may hit or call the cloud based database 113 with the cloud database format query, using a pull method and/or push method. In an exemplary embodiment, the cloud database format query may be transmitted to the cloud-based database 113 using a REST service call from service component 115 associated with the engine 112. In another embodiment, whenever a change occurs or key event occurs, the system may be triggered to send data. The cloud database format query may be transmitted to the engine 112 from the computing system 120 in response to the cloud database format query being built. Embodiments of the engine 112 may be an elastic SOLR search engine for accessing and/or querying the cloud platform database 113, based on a CQL search query language. The data may be extracted from the database 113 from all column families by a single REST service call, or one REST service call may be used for each column family in the cloud-based database 113.

Furthermore, embodiments of the computing system 120 may include a data receiving module 134. Embodiments of the data receiving module 134 of the adapter system 130 of the computing system 120 may include one or more components of hardware and/or software program code for receiving the extracted data from the cloud based database in a Java Script Object Notation (JSON) format. The data may be received from the cloud based database 113 and may be loaded into a TEMP table. In an exemplary embodiment, data may be loaded into a TEMP table so that a user may join the data with any other DB2 table. Further, embodiments of the data receiving module 134 may send or otherwise deliver the extracted data in JSON format back to the mainframe 111.

In response to receiving the data, the computing system 120 may convert the retrieved or received ASCII data into EBCDIC format for processing. Thus, embodiments of the computing system 120 may include a requesting component and a responding component. The responding component may be utilized to convert the retrieved data, such as ASCII data, to COBOL data, such as EBCDIC data, for processing by the mainframe 111 including the COBOL programs.

Referring still to FIG. 1, embodiments of the computer system 120 may be equipped with a memory device 142 which may store the queries, application data, table information, index information, information/data, reports, etc., and a processor 141 for implementing the tasks associated with of the enterprise integration processing system 100.

Figure 3:
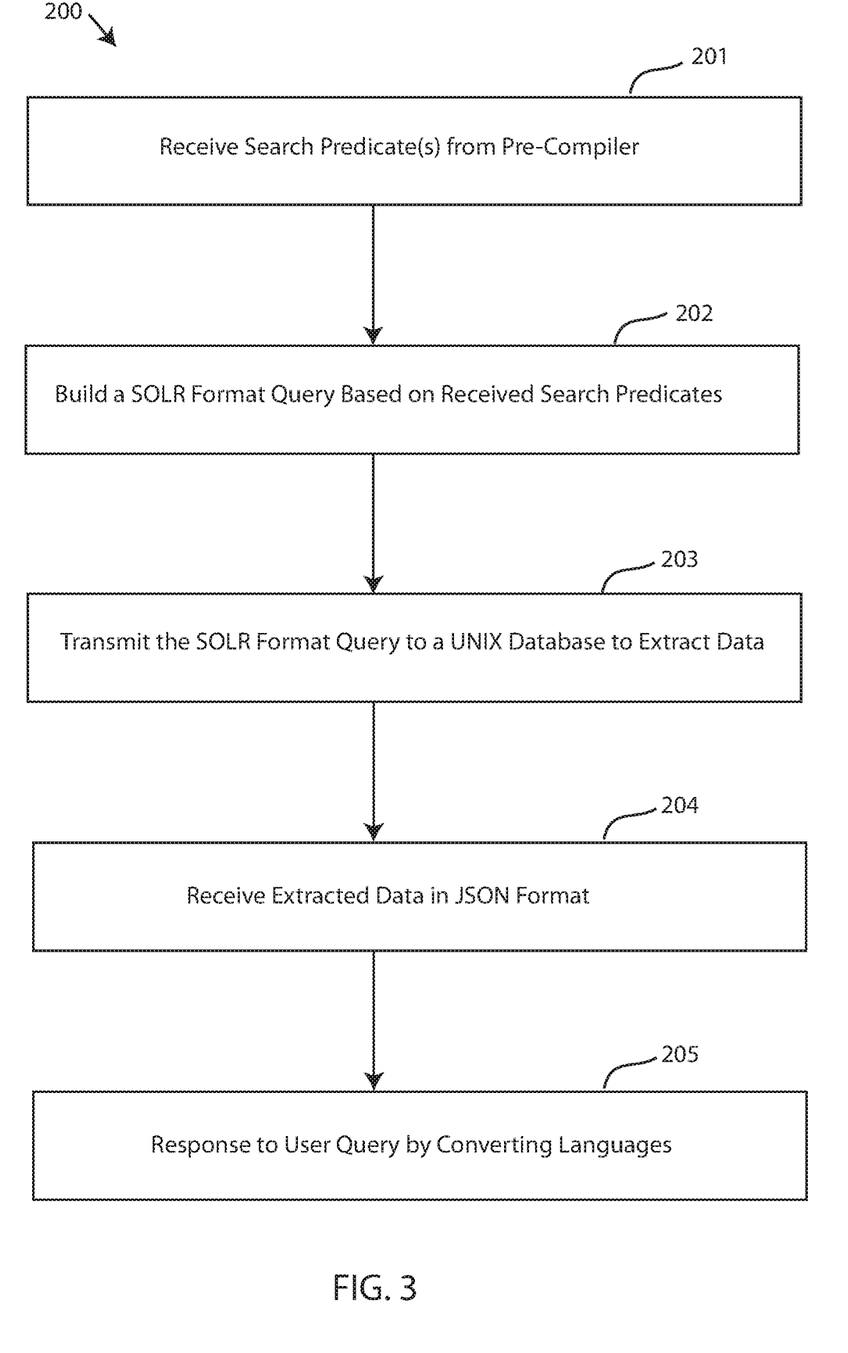
FIG. 3 depicts a flowchart of a method for facilitating a mainframe batch COBOL program to read from a cloud based database and respond to the mainframe batch COBOL program, in accordance with embodiments of the present invention.

With continued reference to the drawings, FIG. 3 depicts a flowchart of a method 200 for facilitating a mainframe batch COBOL program to read from a cloud based database, in accordance with embodiments of the present invention. One embodiment of a method 200 or algorithm that may be implemented for facilitating a mainframe batch COBOL program to read from a cloud based database in accordance with the enterprise integration system 100 described in FIGS. 1-2 using one or more computer systems as defined generically in FIG. 4 below, and more specifically by the specific embodiments of FIGS. 1-2.

Embodiments of the method 200 for facilitating a mainframe batch COBOL program to read from a cloud based database may begin at step 201 wherein search predicates are received from the pre-complier 110. For example, the pre-compiler 110 may parse a SQL query submitted by a user running an application on a mainframe 111 level, and pass the search predicates to the adapter computing system 120. Step 202 builds a cloud database format query based on the search predicates received from the pre-compiler 110. Step 203 transmits the cloud database format query to the cloud based database 113 for data extraction. Step 204 receives the extracted data in JSON format for delivering back to the mainframe 111 or to send to another extended language precompiler. Step 205 responds to the user query by converting the retrieved ASCII data into the EDCDIC format, for displaying/reading by the mainframe 111 COBOL programs.

Figure 4:
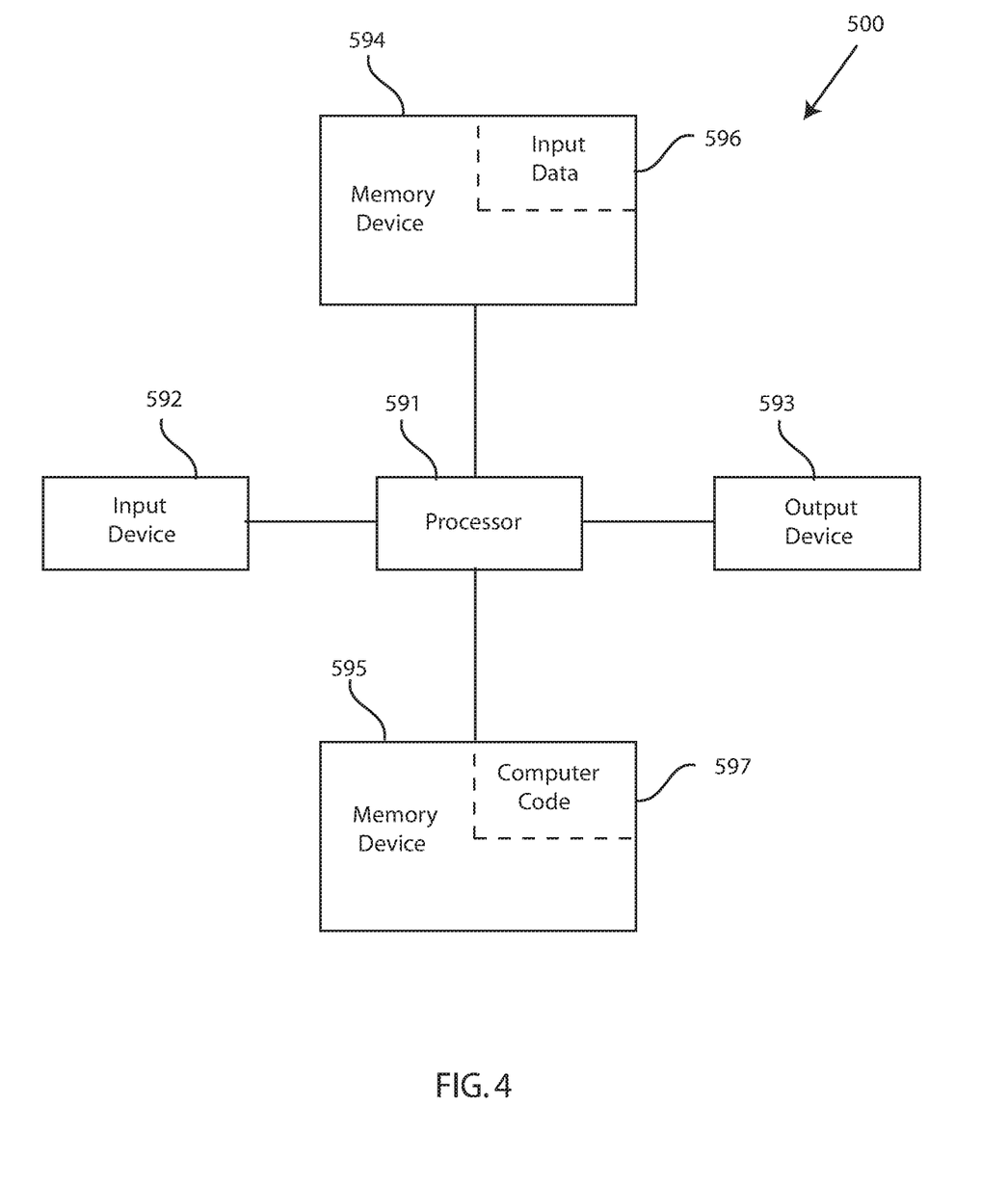
FIG. 4 depicts a block diagram of a computer system for the enterprise integration processing system 100 of FIG. 1, capable of implementing methods for facilitating a mainframe batch COBOL program to read from a cloud database of FIG. 3, in accordance with embodiments of the present invention.

FIG. 4 depicts a block diagram of a computer system for the enterprise integration processing system 100 of FIG. 1, capable of implementing methods for facilitating a mainframe batch COBOL program to read from a cloud based database of FIG. 3, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for facilitating a mainframe batch COBOL program to read from a cloud based database, in the manner prescribed by the embodiments of FIG. 3 using the enterprise integration processing system 100 of FIGS. 1-2, wherein the instructions of the computer code 597 may be executed by processor 591 via memory device 595. The computer code 597 may include software or program instructions that may implement one or more algorithms for implementing the methods for facilitating a mainframe batch COBOL program to read from a cloud based database, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 4.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to enterprise integration processing systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide enterprise integration processing system for facilitating a mainframe batch COBOL program to read from a cloud based database. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for facilitating a mainframe batch COBOL program to read from a cloud based database. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for facilitating a mainframe batch COBOL program to read from a cloud database.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for facilitating a mainframe batch COBOL program to read from a cloud database, comprising:
    receiving, by a processor of a computing system, a first search predicate and a second search predicate from an extended language pre-compiler, the extended language pre-compiler parsing a user query written as a SQL query;

extracting, by the processor, data stored on the cloud database associated with the user query, as a function of transmitting a cloud database format query to the cloud database, the cloud database format query being based on the first search predicate and the second predicate; and receiving, by the processor, the extracted data from the cloud database in a Java Script Object Notation (JSON) format.

2. The method of claim 1, further comprising: providing, by the processor, the extracted data in JSON format to the pre-complier, which in turn parses the data and converts the extracted data which is in ASCII language format into EBCDIC language format.

3. The method of claim 1, further comprising: creating, by the processor, a TEMP (Temporary) table and loading the extracted data into the TEMP table.

4. The method of claim 1, wherein a unique routine is invoked when: the user query does not have unequal predicates and wants to load the data into a temporary table, and creates the temporary table dynamically and load the data into the temporary table; the user query has unequal predicates and wants to load the data into the temporary table, and creates the temporary table dynamically and loads the data into the temporary table after processing unequal predicates like >, <, >=, <= and < >.

5. The method of claim 1, wherein the first search predicate is a SELECT, and the second search predicate is WHERE.

6. The method of claim 1, wherein the data extraction is performed using a REST call.

7. A computer system, comprising:
a processor;
a memory device coupled to the processor; and
a computer readable storage device coupled to the processor, wherein the storage device contains program code executable by the processor via the memory device to implement a method for facilitating a mainframe batch COBOL program to read from a cloud database, the method comprising:
  receiving, by a processor of a computing system, a first search predicate and a second search predicate from an extended language pre-compiler, the extended language pre-compiler parsing a user query written as a SQL query;
  extracting, by the processor, data stored on the cloud database associated with the user query, as a function of transmitting a cloud database format query to the cloud database, the cloud database format query being based on the first search predicate and the second predicate; and
  receiving, by the processor, the extracted data from the cloud database in a Java Script Object Notation (JSON) format.

8. The computer system of claim 7, further comprising: further comprising: providing, by the processor, the extracted data in JSON format to the pre-complier, which in turn parses the data and converts the extracted data which is in ASCII language format into EBCDIC language format.

9. The computer system of claim 7, further comprising: creating, by the processor, a TEMP (Temporary) table and loading the extracted data into the TEMP table.

10. The computer system of claim 7, wherein a unique routine is invoked when: the user query does not have unequal predicates and wants to load the data into a temporary table, and creates the temporary table dynamically and load the data into the temporary table; the user query has unequal predicates and wants to load the data into the temporary table, and creates the temporary table dynamically and loads the data into the temporary table after processing unequal predicates like >, <, >=, <= and < >.

11. The computer system of claim 7, wherein the first search predicate is a SELECT, and the second search predicate is WHERE.

12. The computer system of claim 7, wherein the data extraction is performed using a REST call.

13. A computer program product, comprising a computer readable hardware storage device storing a computer readable program code, the computer readable program code comprising an algorithm that when executed by a computer processor of a computing system implements a method for facilitating a mainframe batch COBOL program to read from a cloud database, comprising:
  receiving, by a processor of a computing system, a first search predicate and a second search predicate from an extended language pre-compiler, the extended language pre-compiler parsing a user query written as a SQL query;
  extracting, by the processor, data stored on the cloud database associated with the user query, as a function of transmitting a cloud database format query to the cloud database, the cloud database format query being based on the first search predicate and the second predicate; and
  receiving, by the processor, the extracted data from the cloud database in a Java Script Object Notation (JSON) format.

14. The computer program product of claim 13, further comprising: further comprising: providing, by the processor, the extracted data in JSON format to the pre-complier, which in turn parses the data and converts the extracted data which is in ASCII language format into EBCDIC language format.

15. The computer program product of claim 13, further comprising: creating, by the processor, a TEMP (Temporary) table and loading the extracted data into the TEMP table.

16. The computer program product of claim 13, wherein a unique routine is invoked when: the user query does not have unequal predicates and wants to load the data into a temporary table, and creates the temporary table dynamically and load the data into the temporary table; the user query has unequal predicates and wants to load the data into the temporary table, and creates the temporary table dynamically and loads the data into the temporary table after processing unequal predicates like >, <, >=, <= and < >.

17. The computer program product of claim 13, wherein the first search predicate is a SELECT, and the second search predicate is WHERE.

18. The computer program product of claim 13, wherein the data extraction is performed using a REST call.

* * * * *